(12) United States Patent
Choi

(10) Patent No.: US 10,417,019 B2
(45) Date of Patent: Sep. 17, 2019

(54) METHOD OF SCREEN SPLITTING AND ELECTRONIC DEVICE ADAPTED TO THE METHOD

(71) Applicant: Samsung Electronics Co., Ltd., Suwon-si (KR)

(72) Inventor: Seungmin Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 424 days.

(21) Appl. No.: 14/919,145

(22) Filed: Oct. 21, 2015

(65) Prior Publication Data
US 2016/0110028 A1 Apr. 21, 2016

(30) Foreign Application Priority Data

Oct. 21, 2014 (KR) .................. 10-2014-0142605

(51) Int. Cl.
*G06F 9/451* (2018.01)
*H04M 1/2745* (2006.01)
*H04M 1/67* (2006.01)

(52) U.S. Cl.
CPC ...... *G06F 9/451* (2018.02); *H04M 1/274583* (2013.01); *H04M 1/27455* (2013.01); *H04M 1/67* (2013.01); *H04M 2250/60* (2013.01)

(58) Field of Classification Search
CPC .......... G06F 9/4443; H04M 1/274583; H04M 1/27455; H04M 1/67; H04M 2250/60
See application file for complete search history.

(56) References Cited

U.S. PATENT DOCUMENTS

| 7,046,134 B2 | 5/2006 | Hansen | |
| 7,375,730 B2* | 5/2008 | Tagliabue | H04M 1/27455 345/440 |
| 2008/0273689 A1* | 11/2008 | Dinoff | H04M 19/04 379/375.01 |
| 2011/0009103 A1* | 1/2011 | Do | G06F 3/0482 455/414.3 |
| 2014/0189030 A1* | 7/2014 | Benchenaa | H04L 51/24 709/207 |

FOREIGN PATENT DOCUMENTS

KR 10-2013-0021505 3/2013

* cited by examiner

*Primary Examiner* — Stella Higgs
(74) *Attorney, Agent, or Firm* — Jefferson IP Law, LLP

(57) ABSTRACT

Various embodiments of the present disclosure relate to a screen splitting method and an electronic device adapted to the method. Embodiments determine a split ratio of lock screen based on the communication information between electronic devices, split the lock screen according to the determined split ratio of lock screen, and display the split screens. The screen splitting method includes: checking communication information corresponding to a contact selected by a user; determining a split ratio of lock screen based on the checked communication information; and displaying the lock screens split based on the split ratio of lock screen. Other embodiments may be implemented.

7 Claims, 5 Drawing Sheets

METHOD OF SCREEN SPLITTING AND ELECTRONIC DEVICE ADAPTED TO THE METHOD

RELATED APPLICATION(S)

This application claims the benefit under 35 U.S.C. § 119(a) of a Korean patent application filed on Oct. 21, 2014 in the Korean Intellectual Property Office and assigned Serial No. 10-2014-0142605, the entire disclosure of which is hereby incorporated by reference.

BACKGROUND

An embodiment of the present disclosure relates to a method of screen splitting based on communication information between electronic devices, and the electronic devices adapted to the method.

With the development of technologies, electronic devices may perform various functions, e.g., data and voice communication, camera function for taking photographs or videos, voice data storage, music file playback through a speaker, image or video playback system, etc. In addition, electronic devices may also be equipped with a game executing function. Electronic devices may also be implemented as multi-media devices. As wireless communication technologies are developed, electronic devices may share data with each other in real time, and also exchange even a large capacity of data with each other. Electronic devices may use data stored in a memory and/or data from other electronic devices via communication. An electronic device may connect to and communicate with other electronic devices in wirelessly. Electronic devices may share data with other electronic devices and may use the shared data through a particular program.

When an electronic device communicates with other electronic devices, the electronic device cannot perform intuitive comparison and ascertainment of information items (e.g., communication histories, communication data, and the like) while communicating with other electronic devices. For example, an electronic device executes a particular application stored in a memory and ascertains particular communication information (e.g., communication history, communication data, and the like) based on the executed application. The communication information may be related to the frequency of contact between the electronic device and other electronic devices. In general, an electronic device may store communication information with the other electronic devices in memory; however, it cannot allow a user to intuitively ascertain the communication information. Therefore, in order to ascertain the communication information, the user needs to execute an application related to the communication information, so as to ascertain the communication information with the executed application. Having to execute an additional application to ascertain the communication information may inconvenience the user. Therefore, the user of the electronic device may find it difficult to efficiently manage any social relationship with other users of other electronic devices.

SUMMARY

The electronic device according to various embodiments of the present disclosure may intuitively display communication information with other electronic devices on the lock screen set by the user, so that the user can intuitively ascertain, when using the electronic device, the communication information on the lock screen.

In accordance with an embodiment of the present invention, the present invention provides a method of screen splitting comprising: checking communication information corresponding to a contact selected; determining a split ratio of lock screen based on the checked communication information; and displaying a lock screen split based on the split ratio of lock screen.

In accordance with another embodiment of the present invention, the present invention provides an electronic device comprising: a memory configured to store communication information; a display configured to display a lock screen; and a controller configured to: check the communication information corresponding to a contact selected by a user; determine a split ratio of lock screen based on the checked communication information; and split the lock screen into split lock screens based on the split ratio of lock screen to display the split lock screens on the display.

BRIEF DESCRIPTION OF THE DRAWINGS

The features and advantages of the invention will become more apparent from the following detailed description in conjunction with the accompanying drawings, in which.

DETAILED DESCRIPTION OF EMBODIMENTS

Figure 1:
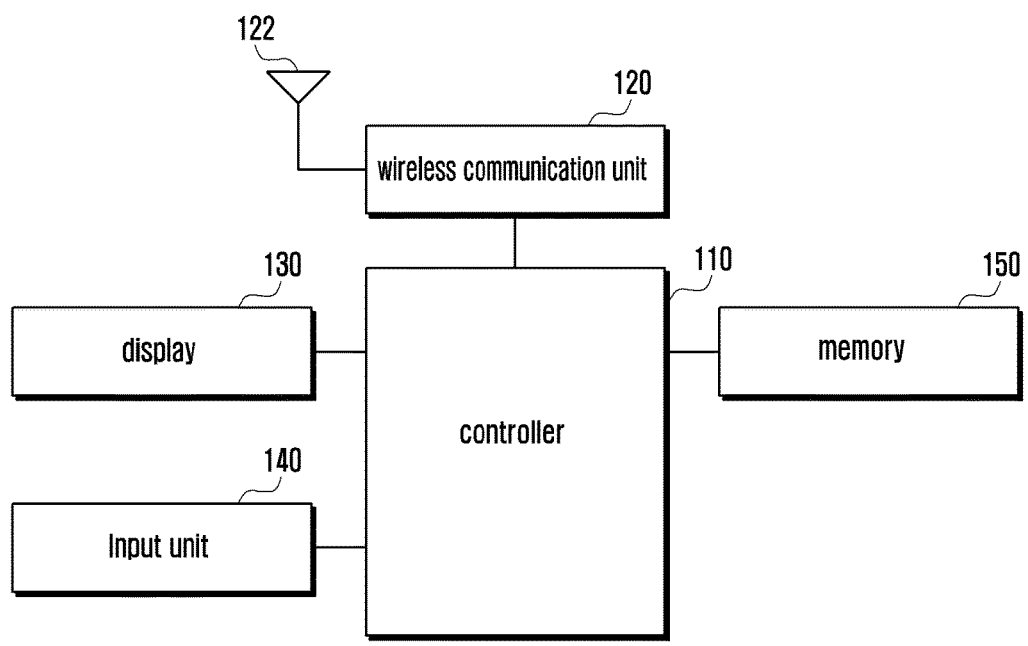
FIG. 1 illustrates a schematic block diagram of an electronic device according to various embodiments of the present disclosure.

Exemplary embodiments of the present disclosure are described with reference to the accompanying drawings in detail. Various changes may be made to the disclosure, and the disclosure may have various forms, such that exemplary embodiments will be illustrated in the drawings and described in detail. However, such an embodiment is not intended to limit the disclosure to the disclosed exemplary embodiment and it should be understood that the embodiment include all changes, equivalents, and substitutes within the spirit and scope of the disclosure. Throughout the drawings, like reference numerals refer to like components.

It will be understood that the expressions "comprises" and "may comprise" is used to specify presence of disclosed function, operation, component, etc. but do not preclude the presence of one or more functions, operations, components, etc. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof. In the present disclosure, the expression "and/or" is taken as specific disclosure of each and any combination of enumerated things. For example, A and/or B is to be taken as specific disclosure of each of A, B, and A and B.

As used herein, terms such as "first," "second," etc. are used to describe various components, however, it is obvious that the components should not be defined by these terms. For example, the terms do not restrict the order and/or importance of the corresponding components. The terms are used only for distinguishing one component from another component. For example, a first component may be referred to as a second component and likewise, a second component may also be referred to as a first component, without departing from the teaching of the inventive concept.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

The expression 'screen splitting,' used for various embodiments, may mean processes of setting areas in a lock screen (a standby screen or an idle screen) of an electronic device and of displaying different images on the set areas, respectively. That is, 'screen splitting' may mean a process of not physically splitting a display of the electronic device but virtually, visually, or logically splitting the lock screen into areas to display the areas in different size. For example, when the lock screen of the electronic device is split into two areas, the electronic device may display the lock screen in a first area and a particular image corresponding to the selected contact in a second area. That is, 'screen splitting' may be a process for the electronic device to split the lock screen into two or more areas and to display different images on the split areas.

The expression 'occupying area,' used for various embodiments, may mean an area occupied by an image. The expression 'extension of an occupying area' may mean that the occupying area of an image displayed on the display of the electronic device is wider extended than the existing area. For example, 'extension of an occupying area' may mean that an image increases in size to extend the area occupying the display of the electronic device. The expression 'reduction of an occupying area' may mean that the occupying area of an image displayed on the display of the electronic device is smaller reduced than the existing area. For example, 'reduction of an occupying area' may mean that an image decreases in size to reduce the area occupying the display of the electronic device.

The expression 'communication information,' used for various embodiments, may information related to a frequency of contact between a first electronic device and a second electronic device. For example, when a first electronic device communicates with a second electronic device, or electronic device A, 'communication information' may include a number of connection requests that the first electronic device has made to electronic device A and a number of communication connection requests that the first electronic device has received from electronic device A. In addition, the expression 'communication information' may be related to an amount of data exchanged between a first electronic device and a second electronic device. For example, 'communication information' may include an amount of data that the first electronic device has transmitted to electronic device A and an amount of data that the electronic device has received from electronic device A, through an application such as Facebook. That is, 'communication information' may be information to verify communication exchange state between a first electronic device and a second electronic device.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

According to various embodiments of the present disclosure, the electronic device may include devices having an operation support function. Examples of the electronic device may include smartphone, table Personal Computer (PC), mobile phone, video phone, electronic book (e-book) reader, desktop PC, laptop PC, netbook computer, Personal Digital Assistant (PDA), Portable Multimedia Player (PMP), MP3 player, mobile medical appliance, camera, wearable device (e.g. head-mounted device (HMD) such as electronic glasses, electronic clothing, electronic bracelet, electronic necklace, electronic appcessory, electronic tattoo, smartwatch, etc.

According to an embodiment, the electronic device may be one of smart home appliances having operation support function. Examples of the smart electronic appliance as an electronic device may include television, Digital Video Disc (DVD) player, audio player, refrigerator, air-conditioner, vacuum cleaner, electronic oven, microwave oven, laundry machine, air cleaner, set-top box, TV box (e.g. Samsung HomeSync™, apple TV™, and google TV™), game console, electronic dictionary, electronic key, camcorder, and electronic frame, etc.

According to an embodiment, examples of the electronic device may include medical device (e.g. Magnetic Resonance Angiography (MRA), Magnetic Resonance Imaging (MRI), Computed Tomography (CT)), Navigation device, Global Positioning System (GPS) receiver, Event Data Recorder (EDR), Flight Data Recorder (FDR), car infotainment device, maritime electronic device (e.g. maritime navigation device and gyro compass), aviation electronic device (avionics), security device, vehicle head unit, industrial or home robot, Automatic Teller's Machine (ATM) of financial institution, Point Of Sales (POS), etc.

According to an embodiment, examples of the electronic device may include furniture and building/structure having a communication function, electronic board, electronic signature receiving device, projector, and metering device (e.g. water, electric, gas, and electric wave metering devices). According to various embodiments, the electronic device may be any combination of the aforementioned devices. According to various embodiments of the present disclosure, the electronic device may be a flexible device. It is obvious to those skilled in the art that the electronic device is not limited to the aforementioned devices.

Descriptions are made of the electronic devices according to various embodiments with reference to accompanying drawings hereinafter. The term 'user' used in various embodiments may denote a person or a device (e.g. artificial intelligent electronic device) using the electronic device.

FIG. 1 is a diagram illustrating a network environment including electronic devices. Referring to FIG. 1, the electronic device 101 may include a controller 110, a wireless communication unit 120, a display 130, an input unit 140, and a memory 150.

The bus connects the aforementioned components to each other and may be a circuit of exchanging signals (e.g. control messages) among the components.

In general, the controller 110 may control the entire operation of the electronic device 100. For example, the controller 110 may receive commands from the other components (e.g., the wireless communication unit 120, the display 130, the input unit 140 and the memory 150) through the bus, decode the received commands, and perform operations and data processing according to the decoded commands. The controller 110 of the electronic device 100 according to various embodiments of the present disclosure may load communication information with a pre-selected contact from the memory 150, split the lock screen displayed through the display 130, based on the communication information, and control the display 130 to display different images on the split screens respectively.

The wireless communication unit 120 may include one or more components for performing wireless communication between the electronic device 100 and another electronic device. Although it is not shown, the wireless communication unit 120 may include a broadcast receiving module, a mobile communication module, a wireless Internet module, a short-range communication module, a location information module, etc. The wireless communication unit 120 may perform wireless communication between the electronic device 100 and other electronic device through the modules described above.

The broadcast receiving module of the wireless communication unit 120 may receive broadcast signals through an antenna 122 or broadcast-related information from an external broadcast management server (not shown) through additional broadcast channels. The broadcast channels may include satellite broadcast channels and terrestrial broadcast channels. The broadcast management server may be a server that creates and transmits broadcast signals and broadcast-related information or a server that receives broadcast signals and broadcast-related information, previously created, and transmits them to a mobile terminal. The broadcast signals may include TV broadcast signals, radio broadcast signals, broadcast signals related to data such as traffic information, and broadcast signals created by combining broadcast signals related to data with TV broadcast signals or radio broadcast signals. The broadcast-related information may be related to broadcast service provider, broadcast programs, broadcast channels, and the like. The broadcast-related information may be received by using various digital broadcast systems, e.g., Electronic Program Guide (EPG) or Digital Video Broadcast-Terrestrial (DVB-T) of Digital Multimedia Broadcasting (DMB), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), etc.

The mobile communication module of the wireless communication unit 120 may transmit/receive wireless signals to/from at least one of the following: a base station (not shown), an external mobile terminal (not shown), and a server (not shown), over a mobile communication network (not shown). The wireless signals may include various types of data according to transmission/reception of text/multimedia messages, video call signals, voice call signals, and the like.

The wireless Internet module of the wireless communication unit 120 is a configuration for wireless Internet access. The wireless Internet module may be implemented as a built-in type or an external type to be connected to the electronic device 100. For example, a wireless Internet technology may employ Wireless LAN (WLAN or Wi-Fi), Wireless broadband (Wibro), World Interoperability for Microwave Access (Wimax), High Speed Downlink Packet Access (HSDPA), etc.

The short-range communication module of the wireless communication unit 120 may perform short range communication. The short-range communication module may employ Bluetooth, Radio Frequency Identification (RFID), Infrared Data Association (IrDA), Ultra Wideband (UWB), ZigBee, etc.

The location information module of the wireless communication unit 120 may be a configuration for obtaining location information about the electronic device 100. A typical example of the location information module is Global Position System (GPS) module.

The wireless communication unit 120 according to various embodiments of the present disclosure may connect the electronic device 100 with a server (not shown) through the modules described above. The wireless communication unit 120 may receive communication information from the server. The communication information may include particular information as the user of the electronic device 100 communicates with other users. The information exchanged by communication may refer to communication histories, created as a result from: communication between the user and other users through their respective electronic devices; transmission/reception of messages between the user and other users through their respective electronic devices; and transmission/reception of messages between the user and other users through Social Network Service (SNS) such as Facebook. In order to receive the communication information described above, the wireless communication unit 120 may connect between the electronic device 100 and the server or between the electronic device 100 and another of the electronic device 100.

The display 130 may display various information (e.g., application programs) stored in the memory 150. The display 130 may also display particular information received from the server or other electronic devices, as well as information stored in the memory 150. The display 130 may include, for example, a panel, a hologram unit, and a projector. The display 130 may further include a control circuit to control the panel, the hologram unit, and the projector. The display unit 130 may include at least one of the following: a Liquid Crystal Display (LCD), a Thin Film Transistor Liquid Crystal Display (TFT LCD), Organic Light Emitting Diodes (OLEDs), a flexible display, and a three-dimensional (3D) display. Although it is not shown, the display 130 may include a touch panel for detecting a user's touch inputs. The display 130 may be implemented with a touch screen, so as to serve as an input device through the touch panel.

The touch panel may sense touch inputs in at least one of the following mode: capacitance sensing, pressure sensing, infrared sensing, and ultrasonic sensing. The touch panel may further include a control circuit. When the touch panel is designed to operate in capacitance sensing mode, it can sense physical touches or proximity of an object. The touch panel may further include a tactile layer. In that case, the touch panel can provide tactile feedback to the user.

The display 130 according to various embodiments of the present disclosure may display a lock screen. The display 130 may split the lock screen based on communication information stored in the memory 150 or received from a server to display the split screens. The display 130 may split the lock screen into a plurality of split areas according to a split ratio determined based on the communication information to display different images in the split areas, correspondingly and respectively.

The input unit 140 may create input signals for controlling the electronic device 100 according to a user's operations. Although it is not shown, the input unit 140 may include a keypad, a dome switch, a touch panel (pressure sensing type or capacitance sensing type), a jog wheel, a jog switch, etc.

The memory 150 may store commands and/or data, received from and/or created by the controller 110 and/or other components (e.g., the wireless communication unit 120, display 130, and the like). Although it is not shown, the memory 150 may include built-in memory or external memory. The built-in memory may include one or more of the following: volatile memory, e.g., dynamic Random Access Memory (DRAM), static Random Access Memory (SRAM), synchronous dynamic Random Access Memory (SDRAM), etc.; non-volatile memory, e.g., one time programmable Read Only Memory (OTPROM), programmable Read Only Memory (PROM), erasable and programmable Read Only Memory (EPROM), electrically erasable and programmable Read Only Memory (EEPROM), mask Read Only Memory, flash Read Only Memory, Not AND (NAND) flash memory, Not OR (NOR) flash memory, and the like. The built-in memory may be a Sold State Drive (SSD). The external memory may further include a flash drive, e.g., compact flash (CF), secure digital (SD), micro-secure digital secure digital (micro-SD), mini-secure digital (mini-SD), extreme digital (XD), a memory stick, etc. The external memory may be functionally connected to the electronic device 100 via various types of interface. According to an embodiment, the electronic device 100 may further include storage devices (or storage media) such as hard drives. The electronic device 100 according to various embodiments of the present disclosure may store communication information of other electronic devices (e.g., contacts) in the memory 150. The electronic device 100 may also store commands for controlling the display 130 based on the communication information in the memory 150. The memory 150 may store an algorithm or executable codes for adjusting a ratio of screen displayed on the display 130 based on the communication information.

Figure 2:
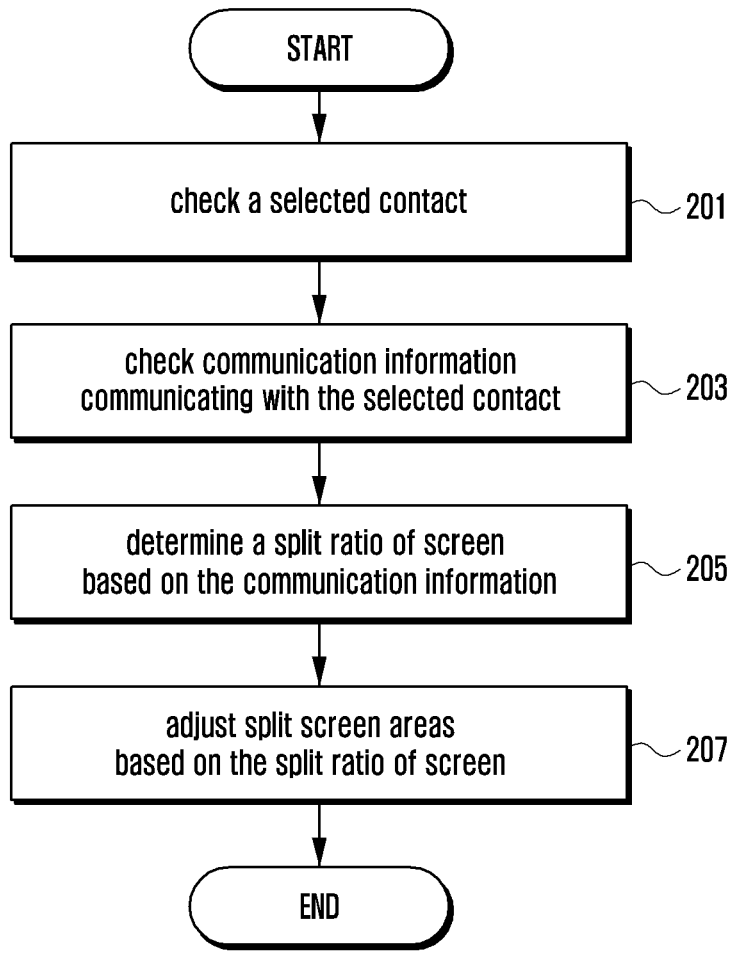
FIG. 2 illustrates a flow diagram that describes a method of splitting a screen based on communication information according to various embodiments of the present disclosure.

FIG. 2 illustrates a flow diagram that describes a method of splitting a screen based on communication information according to various embodiments of the present disclosure.

Referring to FIG. 2, the controller 110 (of FIG. 1) may check a selected contact in operation 201. The selected contact may be previously selected by a user's setting. For example, the controller 110 may check a contact that the user has previously selected and set, or a contact that the user selects through the input unit 140 (of FIG. 1). The controller 110 may check communication information communicating with the selected contact stored in the memory 150 in operation 203. For example, the controller 110 may store communication information in the memory 150, created as the electronic device 100 (of FIG. 1) communicates with other electronic devices (e.g., a contact of another electronic device). The communication information may include communication connection requests that the electronic device 100 has made to other electronic devices, or communication connection requests that the electronic device 100 has received from another electronic device. The communication information may include various signal requests that the electronic device 100 has made to connect to the other electronic device, such as a telephone call, transmission/reception of messages, a notification by a particular messenger application (e.g., Facebook). The communication information may also include information about an amount of data transmitted between the electronic device 100 and the other electronic device. For example, when the electronic device 100 transmits a relatively long text message to a second electronic device, the electronic device may receive a relatively short text message from the second electronic device. This may mean that the electronic device 100 transmitted a larger amount of data to the second electronic device than received from the second electronic device. This may show that the user of the electronic device 100 is making more effort than the second electronic device user in order to maintain the social relationship therebetween. In addition, when the user of the electronic device 100 makes a call to a second user of the second electronic device, the communication information may include a period of time for which the user of the electronic device 100 makes a call to and talks with a user of the second electronic device, and a period of time for which the user of the electronic device 100 receives a call from and talks with the user of the second electronic device. Similar to the case of the amount of data, when a period of time for which the user of the electronic device 100 makes a call to and talks with the user of the second electronic device is larger than a time period for which the user of the electronic device 100 receives a call from and talks with the user of the second electronic device, the difference may show that the user of the electronic device 100 is making more effort than the user of the second electronic device user in order to maintain a social relationship therebetween. The controller 110 may store the communication information in the memory 150, particularly according to periods of time, number of times, and amount of data. The communication information may have been stored in the memory 150 of the electronic device 100, or may be received from external devices through a server. That is, the controller 110 may receive communication information corresponding to the selected contact from the server connected to the selected contact or may load communication information from the memory 150. As used herein, the divided categories are periods of time, number of times, and amount of data, but not limited thereto. The controller 110 may determine a split ratio of screen based on the checked communication information in operation 205. The controller 110 may determine a split ratio of screen based on the communication information between the electronic device 100 and the selected contact. For example, when the controller 110 intends to determine split ratio of screen based on the number of call requests included in the communication information, it may check a number of calls that the electronic device 100 has made to the selected contact and a number of calls that the electronic device 100 has received from the selected contact, so as to determine a split ratio of screen based on the number of calls. In this case, the reference date may be set by a user's settings. The 'reference date' may be a date set to measure the number of call requests. That is, the controller 110 may determine a split ratio of screen based on the number of call requests from a reference date set by the user to the present time. For example, when the number of calls that the electronic device 100 has made to a selected contact is five and the number of calls that the electronic device 100 has received from the selected contact is one, the controller 110 may determine the split ratio of screen as 5:1. When the split ratio of screen is 5:1, the display 130 of the electronic device 100 shows two split screens one of which occupies ⅚ of the entire area of the display 130 and the other of which occupies ⅙. One split screen occupying ⅚ of the entire area of the display 130 may be set as screen A (of FIG. 3A), and the other split screen occupying ⅙ may be set as screen B (of FIG. 3A). In addition, screen A and screen B may be arbitrarily selected by the user of the electronic device 100. For example, the user may set the home screen of the electronic device 100 as screen A and a home screen of an electronic device corresponding to the selected contact as screen B. Screen A may be the extent of interest that the user of the electronic device 100 has in a user of the selected contact, and may be relatively compared with screen B. Similarly, screen B may be the extent of interest that the user of the selected contact has in the user of the electronic device 100. The occupying area of screen A is relatively large, and this may mean that the user of the electronic device 100 has called the user of the selected contact more frequently than the user of the selected has called the user of the electronic device 100. This may also mean that the user of the electronic device 100 has more interest in the user of the selected contact than the user of the selected contact does in the user of the electronic device 100. The controller 110 may adjust the areas of the split screens based on the determined, split ratio of screen in operation 207. Adjusting the areas of split screens may mean processes of splitting the screen into two or more areas and altering the split screen areas corresponding to the split ratio of screen. The controller 110 may split the screen into horizontal or vertical areas. It should be understood that the present disclosure is not limited by the directions for splitting the screen or the shapes of the split screens. For example, when the controller 110 ascertains that the number of selected contact is one user in operation 201, it may split the screen into left and right areas, or two split screens, with respect to a boundary bar 322 (split bar), vertically set, based on the communication information with the selected contact. On the other hand, when the boundary bar has been set in the horizontal direction, the controller 110 may split the screen into the top and bottom areas, or two split screens. In the embodiment, screen A may show a particular image stored in the memory 150 and screen B may show a particular image received from the electronic device corresponding to the selected contact. For example, screen B may show a background screen image of the electronic device corresponding to the selected contact. Screen B may also show the background screen image of the electronic device corresponding to the selected contact, along with the selected contact. When the controller 110 ascertains that the number of selected contacts is two or more, it may increase the number of split screen areas in proportion to the number of selected contacts. For example, when the number of selected contacts is three, the controller 110 may split the screen into three screen areas. Although the embodiment describes in such a way that the screen is split vertically or horizontally, it should be understood that the present invention is not limited by the screen splitting direction. Although it is not shown, the electronic device 100 may determine the occupying area of the display 130 based on particular numerical information sharing with other electronic devices, in addition to the communication information described above. For example, when the electronic device 100 is connected to the second electronic device, and is running a game application online, the size of the split screen areas displayed on the display 130 may also be adjusted based on the game scores between the electronic device 100 and the other electronic device. That is, the electronic device 100 and other electronic device share the game scores with each other, and the size of the screen areas may be adjusted based on the comparison of the game scores.

Figure 3A:
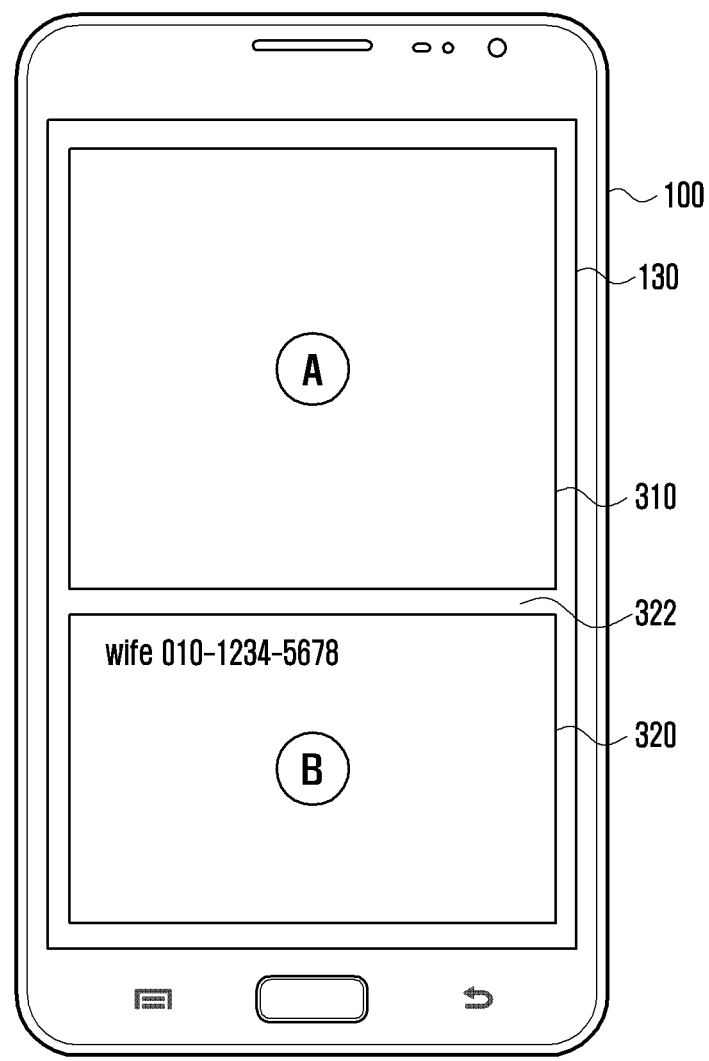
FIGS. 3A and 3B are diagrams illustrating screens split by the method of screen splitting according to an embodiment of the present disclosure.
Figure 3B:
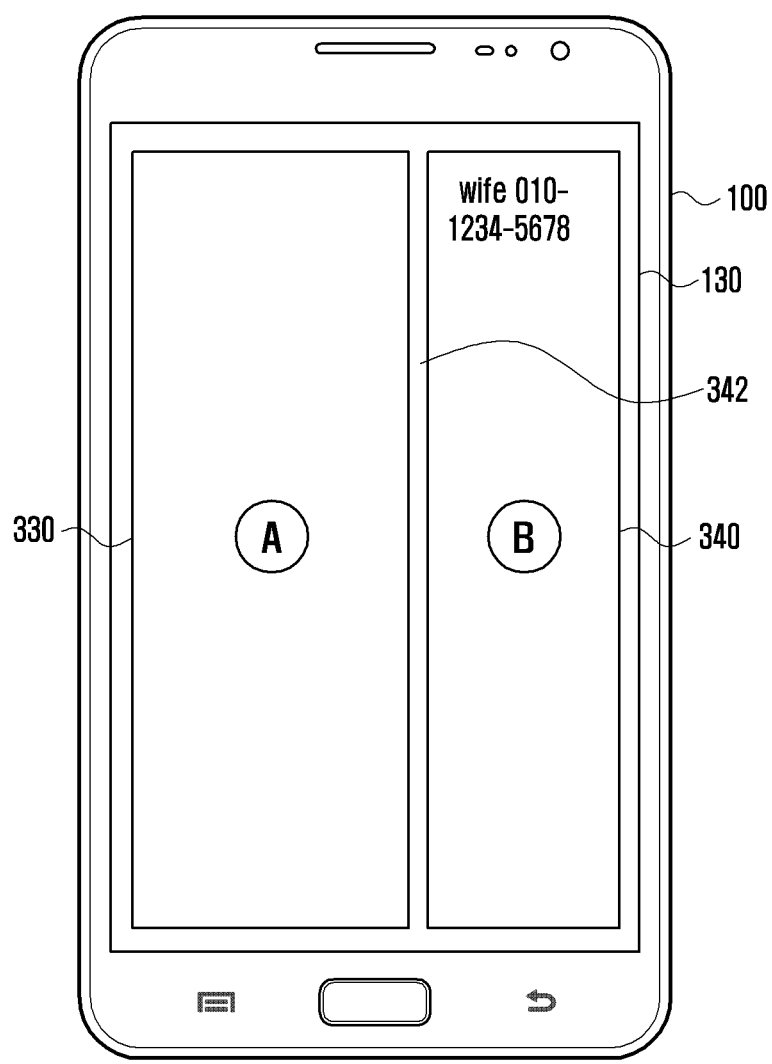

FIGS. 3A and 3B are diagrams illustrating screens split by the method of screen splitting according to an embodiment of the present disclosure.

Referring to FIG. 3A, the electronic device 100 may include a display 130. The controller 110 (of FIG. 1) may control the display 130 (of FIG. 1) to show a particular image. The particular image may be an image file stored in the memory 150 (of FIG. 1) of the electronic device 100 (of FIG. 1), or a particular image file received from a second electronic device that the electronic device 100 is connected to and shares information with. The screen splitting method according to various embodiments of the present disclosure is described based on a process of splitting a lock screen, but not limited thereto. The controller 110 may check a contact previously selected by the user to ascertain the communication information between the electronic device 100 and the selected contact. The controller 110 may determine a split ratio of screen based on the communication information and may split the screen into screen A, indicated by reference number 310, and screen B, indicated by reference number 320, corresponding to the determined, split ratio of screen, to display them. Screen B may be a screen of an electronic device corresponding to the selected contact. Screen B may show the screen of an electronic device corresponding to the selected contact, along with the selected contact. Although the embodiment is implemented in such a way that the screen is split into screen 310 and screen 320, located at the top and bottom areas on the display 130, with respect to the horizontal boundary bar (horizontal split bar), it should be understood that the present invention is not limited to the embodiment. In addition, it should be understood that the split screens 310 and 320 are not limited to the rectangle as shown in FIG. 3A. When the split ratio of screen is determined based on a number of communication requests between the contacts, included in the communication information, the size of screen 310 may correspond to a ratio of communication requests that the user of the electronic device 100 has made to the user of the selected contact and the size of screen 320 may correspond to a ratio of communication requests that the user of the electronic device 100 has received from the user of the selected contact. Referring to FIG. 3A, the user of the electronic device 100 has made communication requests to the user of the selected contact more frequently than the user of the selected contact has to the user of the electronic device 100. That is, the user of the electronic device 100 recognizes the split ratio of screen displayed on the lock screen and may make a determination how to smoothly maintain the social relationship with the other user. For example, when the ratio corresponding to the number of communication requests that the user of the electronic device 100 has received from the user of the selected contact is much larger than that corresponding to the number of communication requests that the user of the electronic device 100 has made to the user of the selected contact, the user of the electronic device 100 may determine that he/she needs to make frequent communication requests to the other user. The controller 110 of the electronic device 100 according to various embodiments of the present disclosure may split the lock screen, first shown on the display when the user uses the electronic device 100, into split screen areas based on the communication information. The user of the electronic device 100 may efficiently manage his/her social relationship with users corresponding to the communication information, based on the split areas of lock screen. The screen splitting method according to various embodiments of the present disclosure and the electronic device adapted to the method may provide information so that the user can intuitively recognize the split ratio of lock screen and determine how to smoothly maintain his/her social relationship with other users.

Referring to FIG. 3B, as the process described above referring to FIG. 3A, the electronic device 100 may split the screen shown on the display 130 into screen A, indicated by reference number 330, and screen B, indicated by reference number 340, based on the communication information, and display them. The occupying area of the split screen 330 may be determined based on a number of communication requests that the user of the electronic device 100 has made to the selected contact, and the occupying area of the split screen 340 may be determined based on the number of communication requests that the user of the electronic device 100 has received from the selected contact. As shown in FIG. 3B, the split screens 330 and 340 may formed as the screen is split into the left and right areas with respect to a vertical boundary bar (vertical split bar) 342. Although various embodiments of the present disclosure are described in such a way that the electronic device 100 splits the screen into areas shaped as rectangle, horizontally (or widthwise) or vertically (or lengthwise), with respect to the display 130, it should be understood that the screen splitting direction is not limited to the horizontal (width) or the vertical (lengthwise) direction and the shape of split screens is not limited to a particular shape such as a rectangle. The split screen areas may show images that have been stored in the memory 150 of the electronic device 100 or received from a server connected to the electronic device 100.

Figure 4:
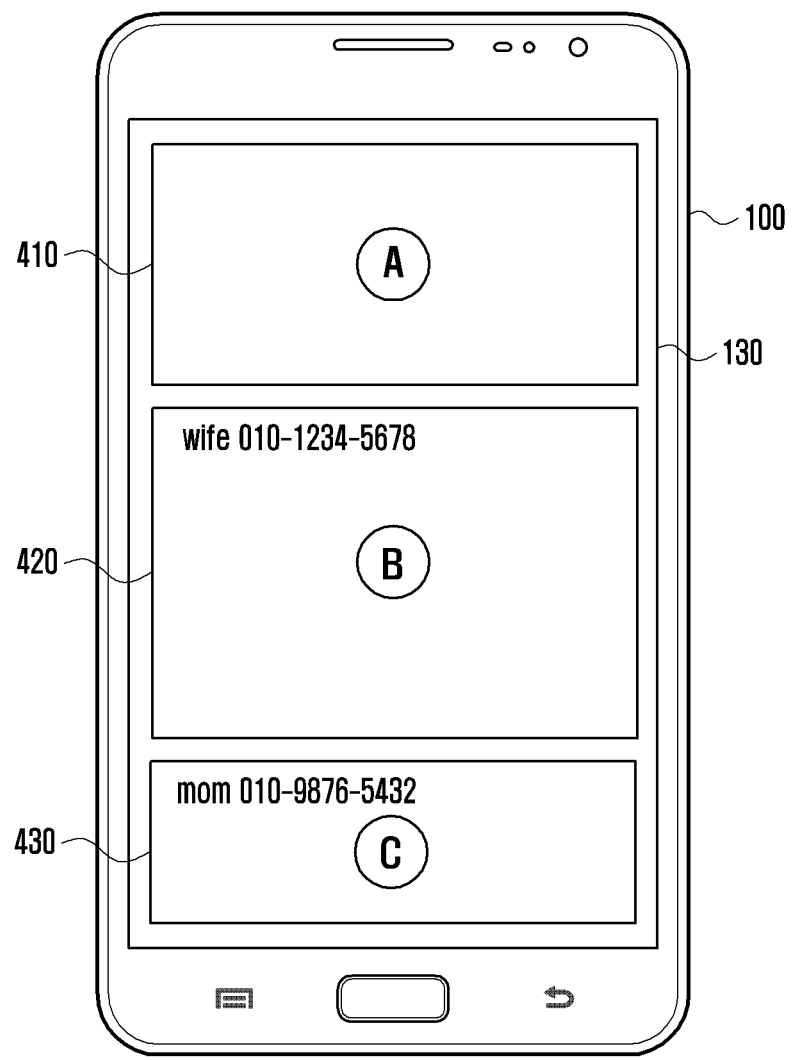
FIG. 4 is a diagram illustrating screens split by the method of screen splitting according to another embodiment of the present disclosure.

FIG. 4 is a diagram illustrating screens split by the method of screen splitting according to another embodiment of the present disclosure.

Referring to FIG. 4, the controller 110 of the electronic device 100 may ascertain that there are two selected contacts. One of the two selected contacts may refer to a first contact and the other may refer to a second contact. The controller 110 may split the lock screen into three screen areas, considering the two selected contacts. For example, the electronic device 100 and the two selected contacts may belong to different groups. For example, when a group chat room has been created by the user of the electronic device 100 and the two users corresponding to the two selected contacts on a messaging application, such as KakaoTalk, the three users may form a group chat room. The three users may chat with each other in the group chat room. The three users may be distinguished from each other by assigning identifying letters A, B, and C. The three users may have the numbers of interactions or messages between them, which may differ from each other. For example, in a group chat room, user A may have participated in 30% of the total number of interactions, user B may have participated in 50% and user C may have participated in 20%. In this case, the server managing the messaging application may store information related to the respective user's numbers of interactions or messages. The electronic device of the user A may download the information related to the numbers of interactions (messages) that have been made in the group chat room from the server managing the messaging application. The information related to the numbers of interactions (messages) may be communication information pertaining to the interaction between users A, B and C. The electronic device of the user A may split the area of the lock screen into screen areas based on the communication information between users A, B and C downloaded from the server. Referring to FIG. 4, the number of user A's interactions is shown on area A, indicated by reference number 410, the number of user B's interactions is shown on area B, indicated by reference number 420, and the number of user C's interactions is shown on area C, indicated by reference number 430. The electronic device 100 may display the lock screen on the display 130, and the lock screen may be split into areas 410, 420, and 430 to display them. The user of the electronic device may set images to be displayed in the respective screen areas as arbitrary images or as profile images of the other users that has been preset to the messaging application, received from the server. Since users A, B and C may share their respective numbers of interactions that have been made in the group chat room with each other, their respective electronic devices have the same split ratio of lock screen so that the split screen areas are shown in the same ratio on the respective displays. Although the embodiment is described in such a way that the screen splitting method splits the screen into screen areas based on the numbers of interactions that users have made in a group chat room, it should be understood that the present invention is not limited the embodiment. Although the various embodiments of the present disclosure are described in such a way that the electronic device 100 splits the lock screen into three split screen areas, it should be understood that the lock screen may be split into a plurality of screens areas corresponding to the number of contacts. It should also be understood that the split screen area is not limited to a particular shape. It should be understood that the split ratio of screen may be set to vary according to communication information.

The screen splitting method and electronic device adapted thereto, according to various embodiments of the present disclosure, may intuitively display communication information communicating with the user's pre-selected contact on the lock screen. The electronic device determines a split ratio of lock screen based on the communication information communicating with the selected contact, splits the lock screen according to the determined split ratio, and displays the split screens. For example, the electronic device may display a first image corresponding to itself (the electronic device), e.g., the home screen image, and a second image corresponding to the selected contact, e.g., a home screen image of other electronic device corresponding to the selected contact, on the two split lock screens, respectively. The user of the electronic device may intuitively respond to the other user corresponding to the selected contact, shown on one of the split lock screens. The method and the electronic device can allow the user to maintain the social relationship with the other user corresponding to the pre-selected contact, referring to the split lock screen. That is, the user of the electronic device can efficiently manage the social relationship with other users shown on the split lock screen, thereby periodically sharing their feelings with each other.

According to various embodiments of the present disclosure, the devices (e.g. modules or their functions) or methods may be implemented by computer program instructions stored in a computer-readable storage medium. In the case that the instructions are executed by at least one processor (e.g. processor 120), the at least one processor may execute the functions corresponding to the instructions. The computer-readable storage medium may be the memory 130. At least a part of the programming module may be implemented (e.g. executed) by the processor 120. At least a part of the programming module may include modules, programs, routines, sets of instructions, and processes for executing the at least one function.

The computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device can be implemented with one or more software modules for executing the operations of the various exemplary embodiments of the present disclosure.

The module or programming module of the present disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

Although various embodiments of the present disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

What is claimed is:

1. A method of screen splitting comprising:
   checking, by a processor, communication information corresponding to a contact selected;
   determining, by the processor, a split ratio of a screen based on the checked communication information;
   dividing, by the processor, the screen into a first area and a second area based on the split ratio; and
   displaying, by the processor, the first area and the second area,
   wherein the split ratio of the screen is determined based on a number of communications requested to the contact and a number of communications received from the contact.

2. The method of claim 1, wherein checking communication information comprises:
   checking communication information stored in a memory.

3. The method of claim 1, wherein checking communication information comprises:
   receiving communication information from a server; and
   checking the received communication information.

4. The method of claim 1, wherein displaying the screen split comprises:
   displaying at least one of a standby screen of an electronic device and a standby screen of an electronic device corresponding to the contact selected.

5. The method of claim 1, wherein the communication information comprises:
   an amount of data, a number of messages, and a number of communication requests that an electronic device has transmitted/received to/from an electronic device corresponding to the contact selected.

6. An electronic device comprising:
   a memory configured to store communication information;
   a display configured to display a screen; and
   a controller configured to:
      check the communication information corresponding to a contact selected by a user,
      determine a split ratio of the screen based on the checked communication information,
      divide the screen into a first area and a second area based on the split ratio,
      display the first area and the second area on the display,
   wherein the split ratio of the screen is determined based on a number of communications requested to the contact and a number of communications received from the contact.

7. The electronic device of claim 6, further comprising:
   a wireless communication unit configured to receive communication information from a server,
   wherein the controller is further configured to:
      receive the communication information from the server through the wireless communication unit, and
      check the received communication information.

* * * * *